United States Patent
Okude et al.

(10) Patent No.: US 7,502,674 B2
(45) Date of Patent: Mar. 10, 2009

(54) ON-VEHICLE TERMINAL SYSTEM

(75) Inventors: Mariko Okude, Hitachi (JP); Tadashi Kamiwaki, Tokai (JP); Yoshinori Endo, Mito (JP); Hideo Hiroshige, Hitachi (JP); Kozo Nakamura, Hitachiota (JP)

(73) Assignees: Hitachi, Ltd., Tokyo (JP); Xanavi Informatics Corporation, Zama-shi (JP)

( * ) Notice: Subject to any disclaimer, the term of this patent is extended or adjusted under 35 U.S.C. 154(b) by 0 days.

(21) Appl. No.: 10/201,640

(22) Filed: Jul. 24, 2002

(65) Prior Publication Data

US 2003/0036843 A1 Feb. 20, 2003

(30) Foreign Application Priority Data

Jul. 25, 2001 (JP) .............................. 2001-224280

(51) Int. Cl.
*G06F 17/40* (2006.01)
*G06F 13/24* (2006.01)

(52) U.S. Cl. .............................. 701/36; 701/1; 701/29; 710/260; 710/261; 710/267

(58) Field of Classification Search ......... 701/200–213, 701/29–31, 36, 1; 705/8; 710/260, 261, 710/267; 342/357.01; 714/3; 711/173; 709/213, 709/214

See application file for complete search history.

(56) References Cited

U.S. PATENT DOCUMENTS

| | | | | |
|---|---|---|---|---|
| 6,279,046 | B1 * | 8/2001 | Armstrong et al. | 710/5 |
| 6,542,926 | B2 * | 4/2003 | Zalewski et al. | 709/213 |
| 6,615,303 | B1 * | 9/2003 | Endo et al. | 710/260 |
| 6,647,508 | B2 * | 11/2003 | Zalewski et al. | 714/3 |
| 6,691,064 | B2 * | 2/2004 | Vroman | 702/183 |
| 6,711,605 | B2 * | 3/2004 | Sekiguchi et al. | 718/100 |
| 6,732,031 | B1 * | 5/2004 | Lightner et al. | 701/33 |
| 2002/0065698 | A1 * | 5/2002 | Schick et al. | 705/8 |

FOREIGN PATENT DOCUMENTS

JP  2000-330806  11/2000

* cited by examiner

*Primary Examiner*—Khoi H. Tran
*Assistant Examiner*—Ronnie Mancho
(74) *Attorney, Agent, or Firm*—Crowell & Moring LLP (57) ABSTRACT

In an on-vehicle terminal system operating a plurality of operating systems, control of peripheral devices connected to the on-vehicle terminal system can be continued even if one of the operating systems is stopped.

A second operating system monitors an operating status of a first operating system using an OS status monitoring function. When the first operating system stops, a list recording allocation of the peripheral devices is updated to switch the allocation to the second operating system. By doing so, an interrupt signal from a peripheral device is allocated to the second operating system, and accordingly the second operating system can control the peripheral device.

5 Claims, 5 Drawing Sheets

ON-VEHICLE TERMINAL SYSTEM

BACKGROUND OF THE INVENTION

1. Field of the Invention

The present invention relates to an on-vehicle system, and particularly to an on-vehicle navigation system which operates a plurality of operating systems.

2. Prior Art

A technology, that in a computer system for operating a plurality of different operating systems using a single processor, a peripheral device connected to a computer is commonly used by a plurality of operating systems, is proposed, for example, in Japanese Patent Application Laid-Open No.2000-330806.

According to the technology, by allocating interrupt signals from the peripheral device to the operating systems depending on causes of the interruption, the peripheral device is commonly used by the plurality of operating systems.

As an example of the on-vehicle terminal system, a navigation system mounted on a vehicle, in general, reads map data recorded in a memory medium such as a CD-ROM, a DVD-ROM or the like as electronic information to develop the data to a graphics. Thus, the navigation system has the function of guiding the vehicle through a route to a destination by displaying the result of the generated map on a display unit.

In recent years, a communication unit such as a cellular phone or the like is connected to the navigation system to obtain information on facilities around a place at present time or a destination from an information center, or to output information on a status of the vehicle based on information from various sensors provided in the vehicle to the outside of the vehicle. Therefore, the peripheral devices such as the display unit, the communication unit, the network unit and so on are connected to the navigation system.

In the navigation system, a single operating system is generally operated. The operating system executes scheduling by controlling various kinds of resources such as a processor, a memory etc and the peripheral devices such as the display unit, the communication unit etc so as to be efficiently operated.

There are various kinds of operating system. Operating systems having various kinds of characteristics have been developed according to the uses. That is, an operating system suitable for batch processing, an operating system suitable for user interface and an operating system suitable for real time processing have been developed.

The navigation system is one kind of computer systems having a processor. Accordingly, the navigation system can commonly use the peripheral devices by operating a plurality of operating system. Therefore, operation of the plurality of operating systems by the navigation system is considered to be useful because processing of the operating part, the communication part can be executed using an OS for office work which is good in user interface and abundant in general applications, and because processing of interruption from the sensors for position detection or the like can be executed using an OS for real-time processing which is high in reliability and speedy in response.

SUMMARY OF THE INVENTION

However, the on-vehicle navigation system having the communication unit connected to is required, for example, to perform communication with the outside of the vehicle in an emergency with reliability from the standpoint of nature. On such an occasion, if operation of the business OS allocated to the peripheral devices used for communication is stopped, it is inconvenient because communication can not be performed.

An object of the present invention is to provide an on-vehicle terminal system operating a plurality of operating systems which can continue to control peripheral devices connected to the on-vehicle terminal system using one of the operating systems even if the other of the operating systems is stopped.

Another object of the present invention is to provide an on-vehicle terminal system for controlling a communication unit so as to send a message to the outside of the vehicle in an emergency.

In order to attain the above objects, the present invention provides an on-vehicle terminal system in which a plurality of operating systems are operated, which comprises an operating status acquisition means for acquiring an operating status of each operating system; an allocation memory means for storing peripheral devices to be controlled by the on-vehicle terminal system and operating systems allocated to the peripheral devices in relation to one another; a means for allocating an interrupt requested from a peripheral device to an operating system referring to the allocation memory means when the interrupt request is made, the operating system having been allocated to the peripheral device; and an allocation switching means for switching allocation of a peripheral device having an operating system allocated in the allocation memory means to the other operating system when the operating status acquisition means acquires stopping of the operating system.

Thereby, even when one of the operating system stops, control of the peripheral device connected to the on-vehicle system can be continued.

Further, the present invention provides an on-vehicle terminal system in which the peripheral devices include a communication unit, and the on-vehicle terminal system further comprises an abnormality acquisition means for acquiring information on abnormalities of a vehicle; and an emergency communication means for sending information on abnormality using the communication unit when the abnormality acquisition means acquires the information on abnormality.

Thereby, the on-vehicle terminal system controlling the communication unit can send a message outside the vehicle in emergency.

DESCRIPTION OF THE PREFERRED EMBODIMENTS

Figure 1:
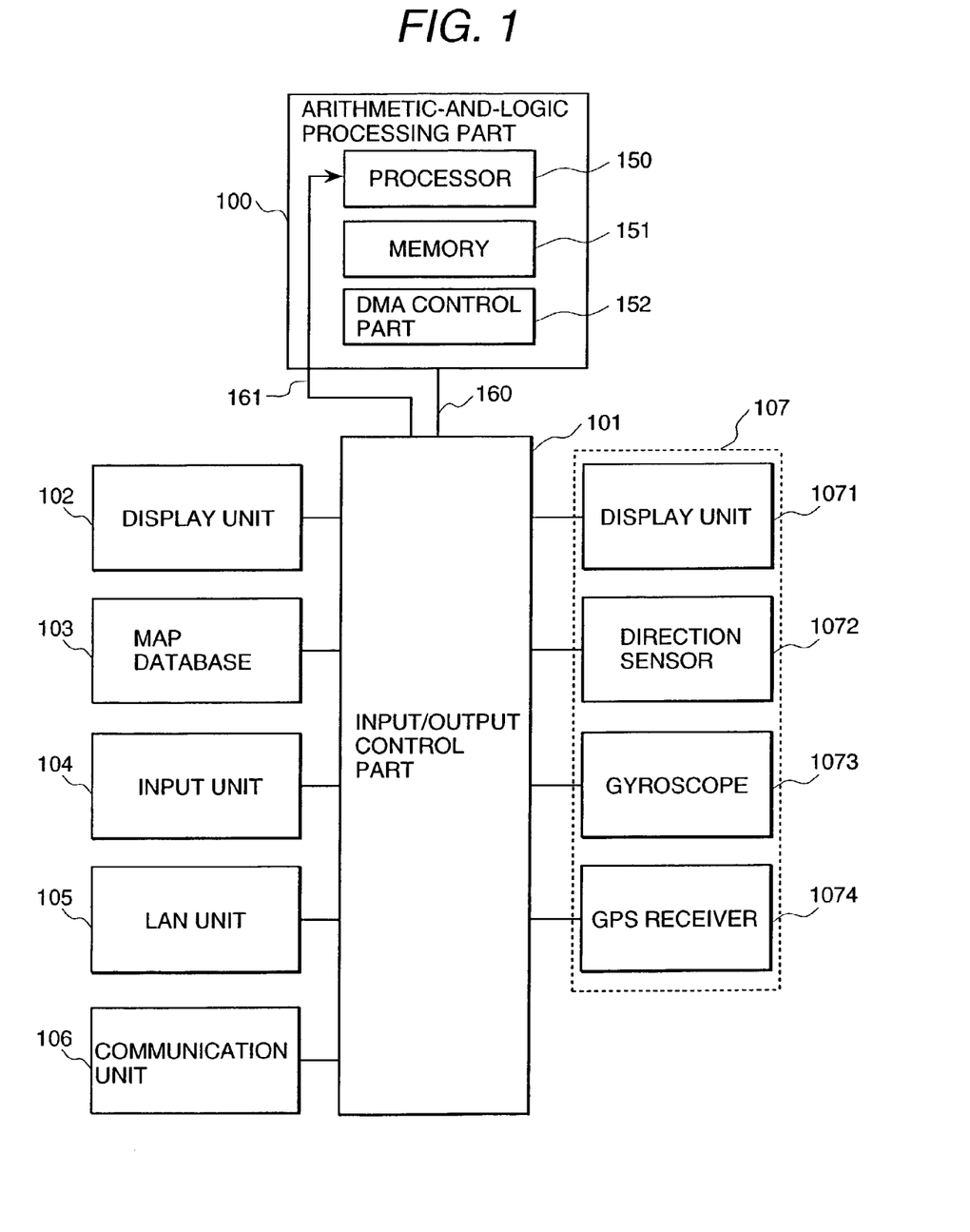
FIG. 1 is a block diagram explaining the construction of an example of an on-vehicle navigation system which mounts a plurality of operating systems (OS).

An embodiment in accordance with the present invention will be described below in detail, referring to the accompanied drawings. FIG. 1 is a block diagram showing the construction of an example of an on-vehicle navigation system which mounts a plurality of operating systems (OS). Referring to FIG. 1, in order to serve as a function of an on-vehicle terminal system, the on-vehicle navigation system comprises an arithmetic-and-logic processing part 100 and an input/output control part 101. A display unit 102, a map database 103, an input unit 104, an LAN unit 105, a communication unit 106 and a group of various kinds of sensors 107 such as a wheel speed sensor 1071, a direction sensor 1072, a gyroscope 1073 and a GPS receiver 1074 are connected to the input/output control part 101 as the peripheral devices. However, the construction of the on-vehicle navigation system is not limited to the above. Further, it is not necessary to provide all the various kinds of sensors composing the group of sensors described above, and it may be possible to provide one kind of the sensor or a combination of some of the sensors.

The arithmetic-and-logic processing part 100 is composed of a processor 150 for operating a plurality of operating systems and for executing processing such as numerical calculation and control of each of the devices; a memory 151 for storing the plurality of operating systems, various kinds of data such as map data, search data, arithmetic data etc and processing programs; and a DMA (direct memory access) control part 152 for executing data transfer between the memory 151 and each of the devices at a high speed.

The arithmetic-and-logic processing part 100 is a central unit for executing various kinds of processing of the on-vehicle navigation system such as present position display processing, route guide processing, dynamic information display processing and so on. For example, in the present position display processing, a present position of the vehicle is calculated from sensor information output from the group of various kind of sensors 107 for measuring a position and the like. Then, based on the obtained present position, map mesh data necessary for map display is read out from the map database 103. After that, the map mesh data is developed to a graphics, and a mark expressing the present position is overlapped on the graphics to display on the display unit 102. On the other hand, in the route guide processing, an instruction from a user is received, and an optimum route connecting between the instructed destination and the present position is searched, and then the search result of route is displayed on the display unit 102 by overlapping the route on the map to guide the user to the destination. Further, in the dynamic information display processing, inquiry on dynamic information required by the user is made to an information center, and processing to display the obtained dynamic information on the display unit 102 is executed.

Further, in the present embodiment, the arithmetic-and-logic processing part 100 operates the plurality of operating systems in parallel to execute mediation processing of the peripheral devices when the peripheral devices are controlled through these operating systems. Particularly, in an occasion when communication with the outside using the communication unit 106 is required in case of emergency or the like, the arithmetic-and-logic processing part 100 allocate an operating system under operation to the communication unit 106 so as to certainly perform the communication. Of course, the processing executed by the arithmetic-and-logic processing part 100 is not limited to this processing.

The input/output control part 101 is a unit for connecting between the arithmetic-and-logic processing part 100 and the peripheral devices, and comprises an I/O function corresponding to an interface of each of the peripheral devices. That is, for, example, the functions are an A/D converting function, an SCI (serial communication interface) function, a graphics controller function and so on.

The input/output control part 101 and the arithmetic-and-logic processing part 100 are connected to each other through a processor bus 160. Further, in order notify completion of input/output operation with the peripheral device, an interrupt signal line 161 is provided between the input/output control part 101 and the processor 150 as a part of the processor bus 160.

The display unit 102 is a unit for displaying graphics information produced by the input/output control part 101 and so on, and is composed of a CRT, a liquid crystal screen etc.

The map database 103 is a database containing map mesh data necessary for map display, guiding information, search information etc. The map database 103 can be constructed of a large capacity memory medium such as a CD-ROM, a DVD-ROM, an IC card or an HDD (hard disk drive).

The input unit 104 is a unit for receiving an instruction from a user. The input unit 104 can be constructed of, for example, a group of hard switches such as a scroll key, a scale change key etc, a joystick and a touch panel placed on the display. Further, a remote control device communicating using an infrared ray or the like may be usable, but the input unit is not limited these devices.

The LAN unit 105 is a unit for performing two-way communication with a vehicle control unit acquiring information from sensors provided to various devices placed in the vehicle such as an engine, a transmission, an air bag etc. The LAN unit 105 is generally connected to different LANs according to purpose of use. The LANs can be classified into, for example, an information system, a control system, a transmission system, a diagnose system and so on. Since the required transmission rate and the required quality are different depending on each of the uses, a LAN unit 105 of a multi-channel type may be mounted.

The communication unit 106 is a unit for performing two-way communication by connecting to a public network or a dedicated network such as MCA (multi channel access system) wireless or the like. The cellular phone, the PHS and the like are typical as the devices for connecting to the public network. Further, the communication devices 106 also include the DSRC such as the ETC of which the installation is being advanced in order to collect toll of a toll road. By connecting the on-vehicle navigation system to the Internet or the like through the communication unit 106, various kinds of contents can be captured into the vehicle.

The wheel speed sensor 1071, the direction sensor 1072, the gyroscope 1073 and the GPS receiver 1074 are used for detecting a position using the on-vehicle navigation system. The wheel speed sensor 1071 measures a distance from a product of the circumferential length of the wheel and a measured number of rotations of the wheel, and further measures a turning angle of the vehicle from a difference between numbers of rotations in the pair of wheels. The direction sensor 1072 detects a direction of an orientation of the vehicle by detecting the geomagnetic field. The gyroscope 1073 is, for example, an optical-fiber gyroscope, a vibratory gyroscope or the like, and detects a turning angle of the vehicle. The GPS receiver 1074 receives signals from GPS satellites. By measuring distances between the vehicle and the satellite and rates of change in the distance for three or more satellites, a present position, a running speed and a running direction of the vehicle are detected.

The plurality of operating systems constructed on the memory 151 in the above-described on-vehicle navigation system will be described below, referring to FIG. 2.

Figure 2:
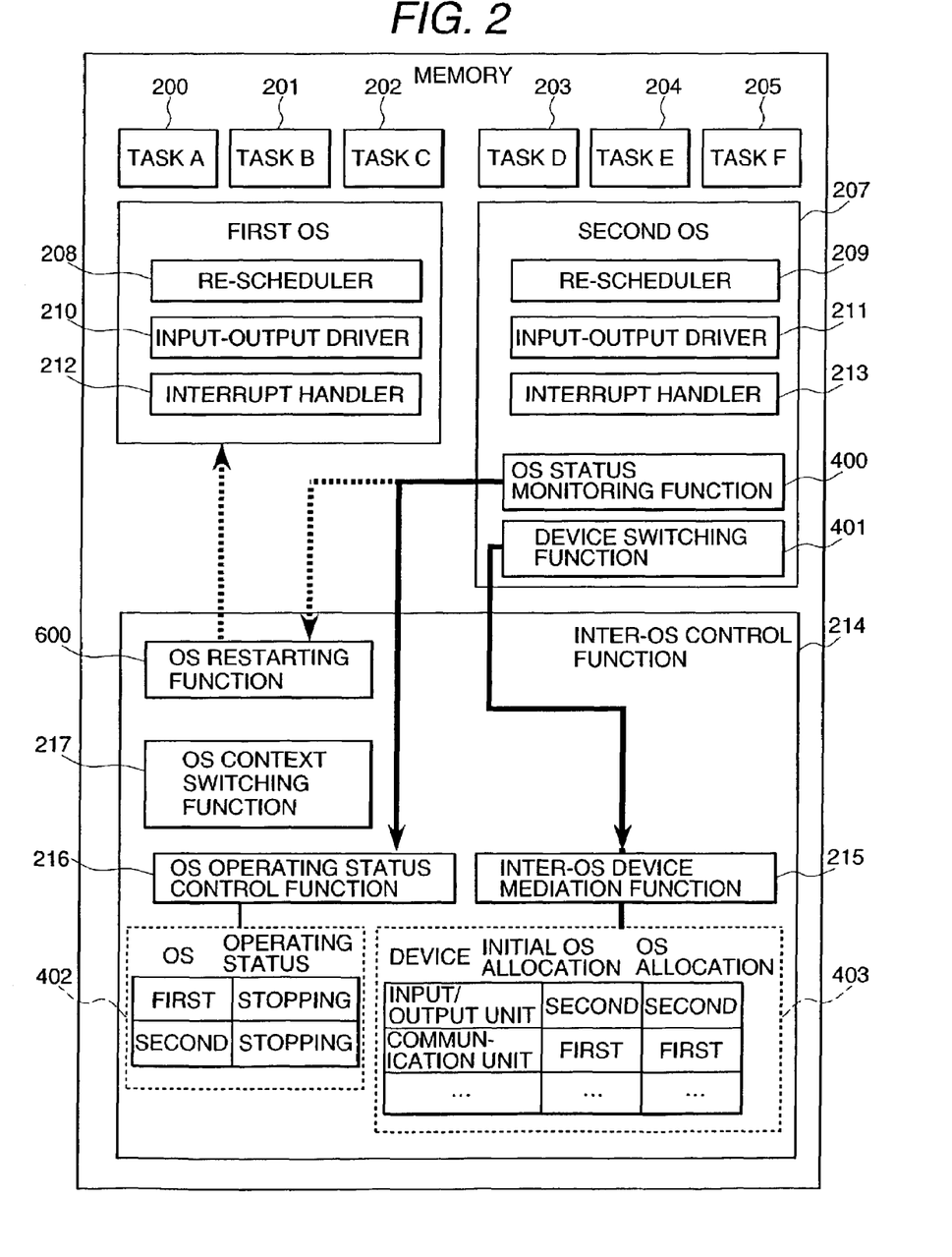
FIG. 2 is a block diagram explaining functions which are constructed on a memory of an arithmetic and logic processing part.

As shown in FIG. 2, a first operating system (a first OS) 206 and a second operating system (a second OS) 207 are constructed on the memory 151. An inter-OS control function 214 is constructed as the function that the individual operating systems commonly use the peripheral devices such as the display unit 102, the input unit 104, the communication unit 106 etc. The inter-OS control function 214 has a basic function to allocate an interrupt signal from a peripheral device to the operating system to which control of the peripheral device is allocated. These operating systems (OS) and the function part constructed on the memory 151 are read and executed by the processor 150 to exert the individual functions.

Each of the first operating system 206 and the second operating system 307 has a re-scheduler 208 or 209, an input-output driver 210 or 211, and an interrupt handler 212 or 213.

The re-scheduler 208 or 209 is started up when task switching must be made according to generation, deletion, stopping, restarting, external interruption and internal interruption of a task. The re-scheduler 208 or 209 stores an execution environment (a program counter, a status register, a general register etc) of a task executed just before in a task management table, and determines a task to be newly executed, and extracting an execution environment for the newly executed task to set each of the registers, and then executes the selected task.

The input-output driver 210 or 211 performs processing of data input and output between the peripheral devices.

The interrupt handler 212 or 213 performs processing of receiving an interrupt request from the peripheral device through the inter-OS control function 214.

The inter-OS control function 214 comprises an inter-OS device mediation function 215 for allocating each of the operating systems to the peripheral devices; an OS operating status control function 216 for managing information on whether each of the operating systems is operated or stopped; an OS context switching function 217 for switching an execution environment of each of the operating systems; and an OS restarting function 600 for restarting the first OS 206.

The inter-OS mediation function 215 manages a device OS allocation list 403 for storing the operating system allocated in the initial setting and which OS is allocated at present time on the peripheral device bases. An interrupt signal from a peripheral device is allocated to any one of the operating systems based on the device OS allocation list. It is assumed that the operation systems allocated in the initial setting are predetermined.

The OS operating status control function 216 forms an OS operating status list 402 for storing an operating status for each of the operating systems, and managing information on the operating status of each of the operating systems. The operating status of the operating system may be, for example, either of "stopping" or "operating". The OS operating status control function 216 periodically acquires an operating status of each of the operating systems, and updates the OS operating status list 402 based on the acquired results.

In the present embodiment, it is assumed that the first operating system 206 used is an OS for office work generally used for a personal computer. The OS for office work is good in human interface, and is in an environment capable of using various kinds of general applications. On the other hand, the OS for office work is not so high in the system reliability. Accordingly, for example, there are some cases that the operation of the OS may stop during processing due to some reason.

It is assumed that the second operating system 207 used is assumed to be an OS for real-time processing. In general, the OS for real-time processing has a real-time property of immediately responding to a request from the external, and the high reliability that the system never stops on any occasion. On the other hand, it can not say that the OS for real-time processing is good in human interface.

It is assumed that the priority of the second OS 207 is higher than the priority of the first OS 206. Under this assumption, while any one of the tasks of the second OS is in an executing state, the second OS 207 uses the resources such as the processor 150 and so on. While all the tasks of the second OS 207 are in idling states or waiting states, the context is switched to the first OS 206 and accordingly the first OS 206 can use the resources such as the processor 150 and so on.

Of course, any kinds of combination of the first operating system and the second operating system may be acceptable. Further, number of the operating systems is not limited to 2.

The first OS 206 and the second OS 207 are operated in parallel, and execute the task A 200 to the task C 202 and the task D 203 to the task F 205 using the resources such as the memory 151 etc allocated to the individual operating system, respectively. In the present embodiment, description has been made on the case where each of the operating systems operated in parallel processes three tasks. However, the present invention is not limited to the number.

Although dynamic change in number of tasks on the operating system has not been assumed in the present embodiment, each of the operating systems can dynamically produce and delete tasks.

Figure 3:
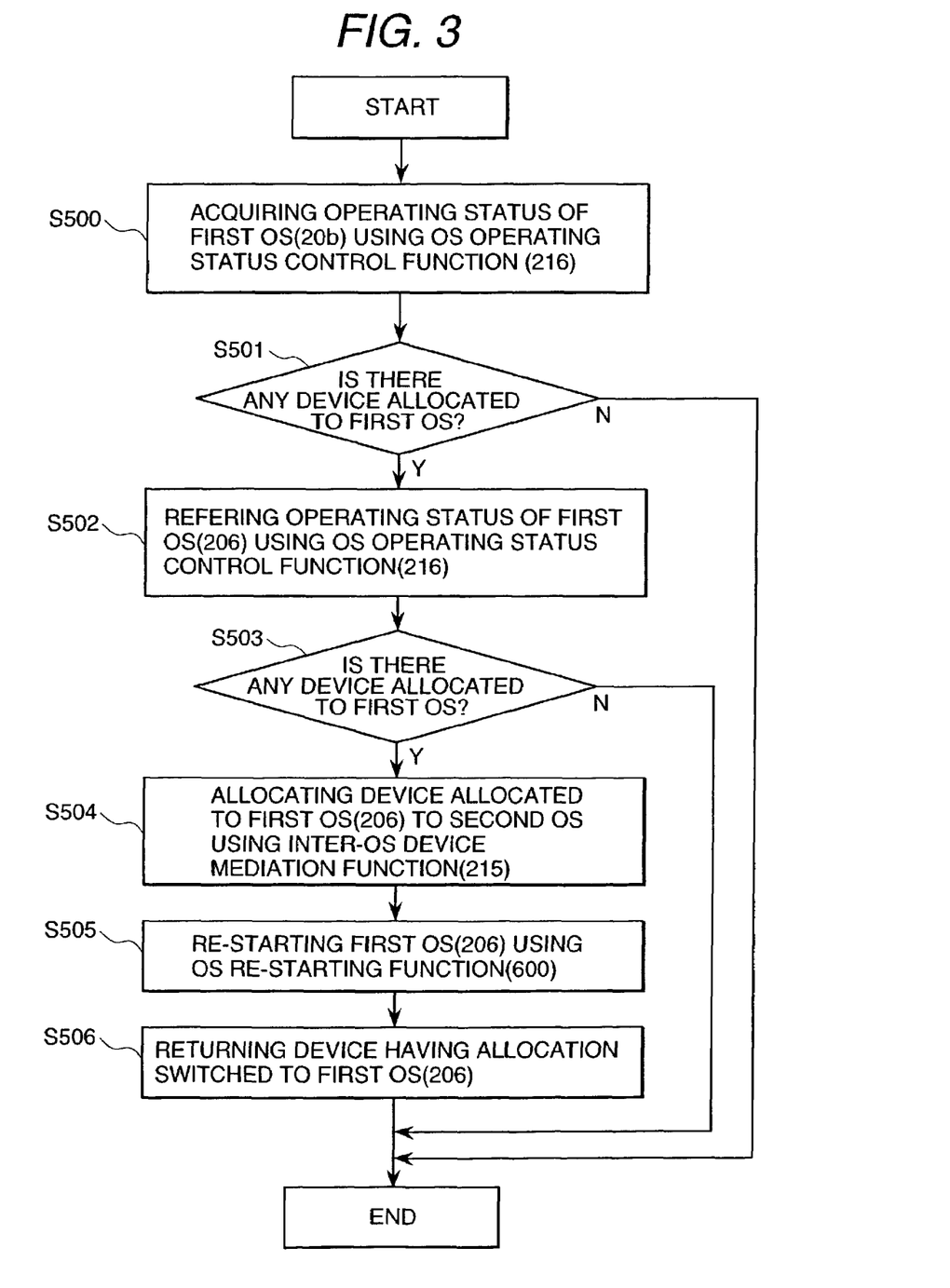
FIG. 3 is a flowchart for explaining the processing that allocation of peripheral devices allocated to a first OS is switched by a second OS.

Description will be made below on the processing that the second OS 207 switches allocation of the peripheral devices allocated to the first OS 206. FIG. 3 is a flowchart explaining the processing. The processing is, for example, periodically performed.

The OS status monitoring function 400 of the second OS 207 acquires an operating status of the first OS 206 using the inter-OS operating status control function 216 (S500). Then, it is judged whether or not the first OS 206 stops (S501). As the result, if the first OS 206 does not stop, the processing is completed.

On the other hand, if the first OS 206 stops, the device switching function 401 judges using the inter OS device mediation function 215 whether or not there is any peripheral device allocated to the first OS 206 (S503). As the result, if there is no peripheral device allocated to the first OS 206, the processing is completed.

On the other hand, if there are some peripheral devices allocated to the first OS 206, the peripheral devices allocated to the first OS 206 are allocated to the second OS using the inter-OS device mediation function 251. That is, the OS allocation of the device OS allocation list 403 is rewritten. By doing so, the peripheral devices can be controlled, even if the first OS 206 is in the stopping status.

Then, the OS status monitoring function 400 makes the first OS 206 restarted using the OS restarting function 600 (S504).

After that, the status of the first OS 206 is periodically monitored using the OS operating status control function 216. Then, when the OS operating status control function 216 detects that the first OS 206 is restarted, the device switching function 401 executes the processing of returning the allocation of the peripheral device having the allocation switched to the second OS 207 to the first OS 206 using the inter-OS device mediation function 215. That is, the peripheral devices having the initial allocation of the first OS in the device allocation list 403 are allocated to the first OS 206 (S505).

Description will be made below on a concrete example in which when abnormality of the vehicle is detected, control of the communication unit 106, one of the peripheral devices, switched from the first OS 206 to the second OS 207. That is, although the communication unit 106 is normally allocated to the first OS 206, the situation of necessity of urgent communication at emergency may occur while the first OS 206 is in the stopping state. In such a case, the allocation of the communication unit 106 is temporarily switched to the high reliable second OS 207 to make the urgent communication possible. When the first OS 206 is restarted, the allocation of the communication unit 106 is returned to the first OS 206 which is good in user interface. Of course, the peripheral device whose allocation is switched is not limited to the communication unit 106.

Figure 4:
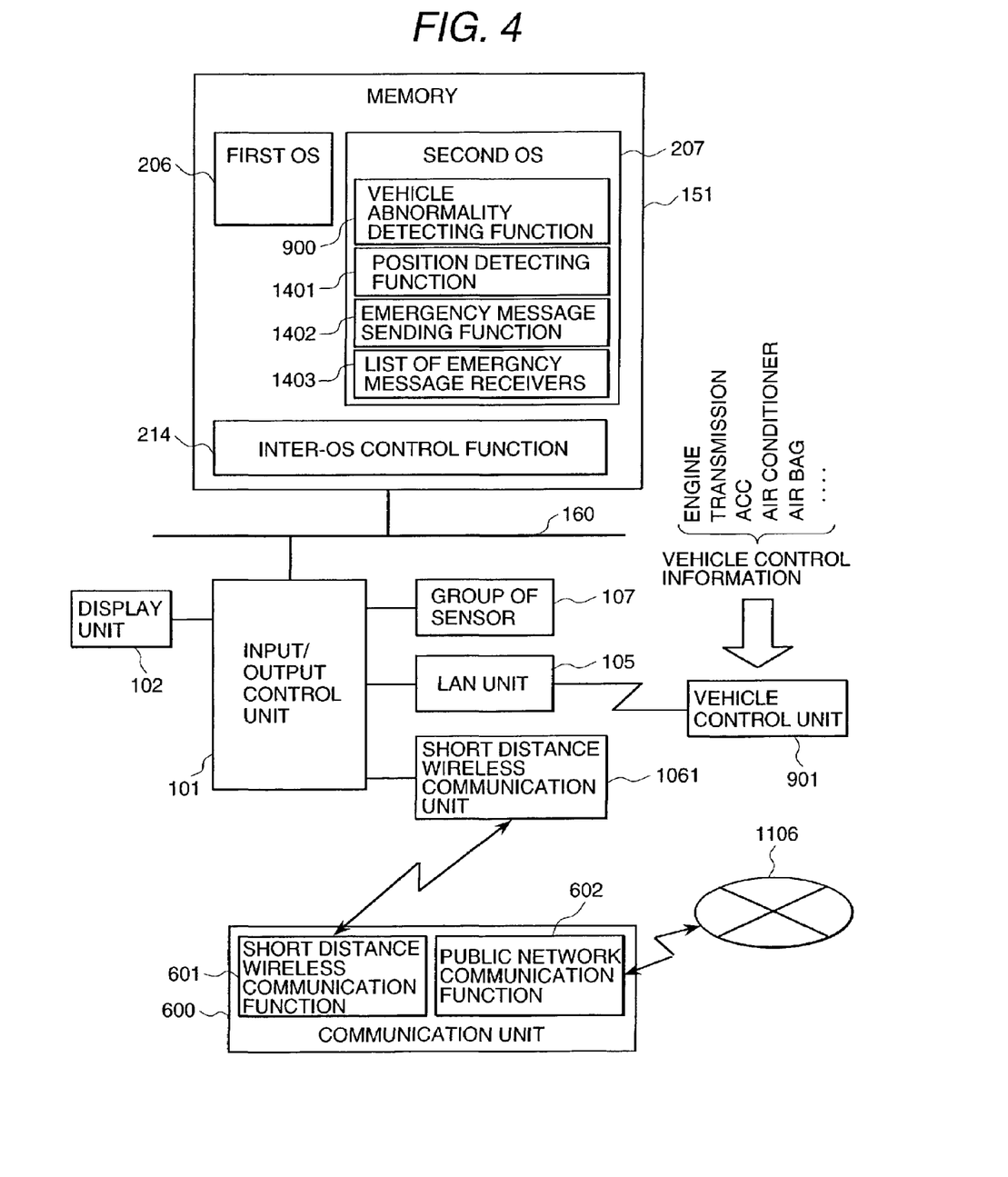
FIG. 4 is a block diagram explaining the construction of an on-vehicle navigation system in a concrete example.

FIG. 4 is a diagram explaining the above-described construction. Referring to the diagram, a vehicle abnormality detecting function 900, a position detecting function 1401, an emergency message sending function 1402 and a list of emergency message receivers 1403 are constructed in the second OS 207.

The vehicle abnormality detecting function 900 acquires vehicle control information including information of sensors provided in an engine, a gear, an ACC (auto cruse control), a radar, an air conditioner, a wiper, an air bag etc through a vehicle control unit 901 connected to the LAN unit 105.

The position detecting function 1401 is a function for detecting a present position of the vehicle based on information from the group of sensors 107 such as a GPS receiver 1074 etc.

The emergency message sending function 1402 is a function for judging an emergency message receiver from the present position detected by the position detecting function 1401 and sending an emergency message to the emergency message receiver at emergency.

The list of emergency message receivers 1402 is a list of positional information and emergency message receiver which are connected to each other. The list of emergency message receivers 1402 stores the nearest emergency message receiver, for example, a telephone number of the nearest police station, for example, on the administrative district basis or on the latitude-longitude range basis. However, the information stored in the list of emergency message receivers is not limited to the above. For example, the list of emergency message receivers may store telephone numbers, e-mail addresses or the like of a fire station, an insurance company, an emergency assistance company, an auto parts company, a car dealer and the like. Further, the list of emergency message receivers may be constructed so that the emergency message receiver can be changed depending on the emergency contents.

Further, in the present embodiment, a short distance wireless communication unit 1061 is employed as the communication unit 106. For example, the Bluetooth of wireless interface specification may be used in the short distance wireless communication unit 1061. Of course, the device and the interface used for the communication unit 106 are not limited to the above.

The short distance wireless communication unit 1061 can communicate with a communication unit 600 having a short distance wireless communication function 601 and a public network communication function 602 using the Bluetooth of wireless interface specification. The communication unit 600 may be a cellular phone mounting the Bluetooth which is assumed to be placed inside the vehicle. The public network communication function 602 of the communication unit 600 can send an emergency message sent by the emergency message sending function 1402 using the short distance wireless communication unit 1061 and received by the short distance wireless function 601 to the emergency message receiver through a public network 1106 or the like. On the other hand, the communication unit 602 can send facility information, traffic information, weather information and the other kinds of information around the present place to the short distance wireless communication unit 1061 by receiving the information from, for example, the public network 1106. The arithmetic-and-logic processor part 100 can display the information received by the short distance wireless communication unit 1061 on, for example, the display unit 102.

Figure 5:
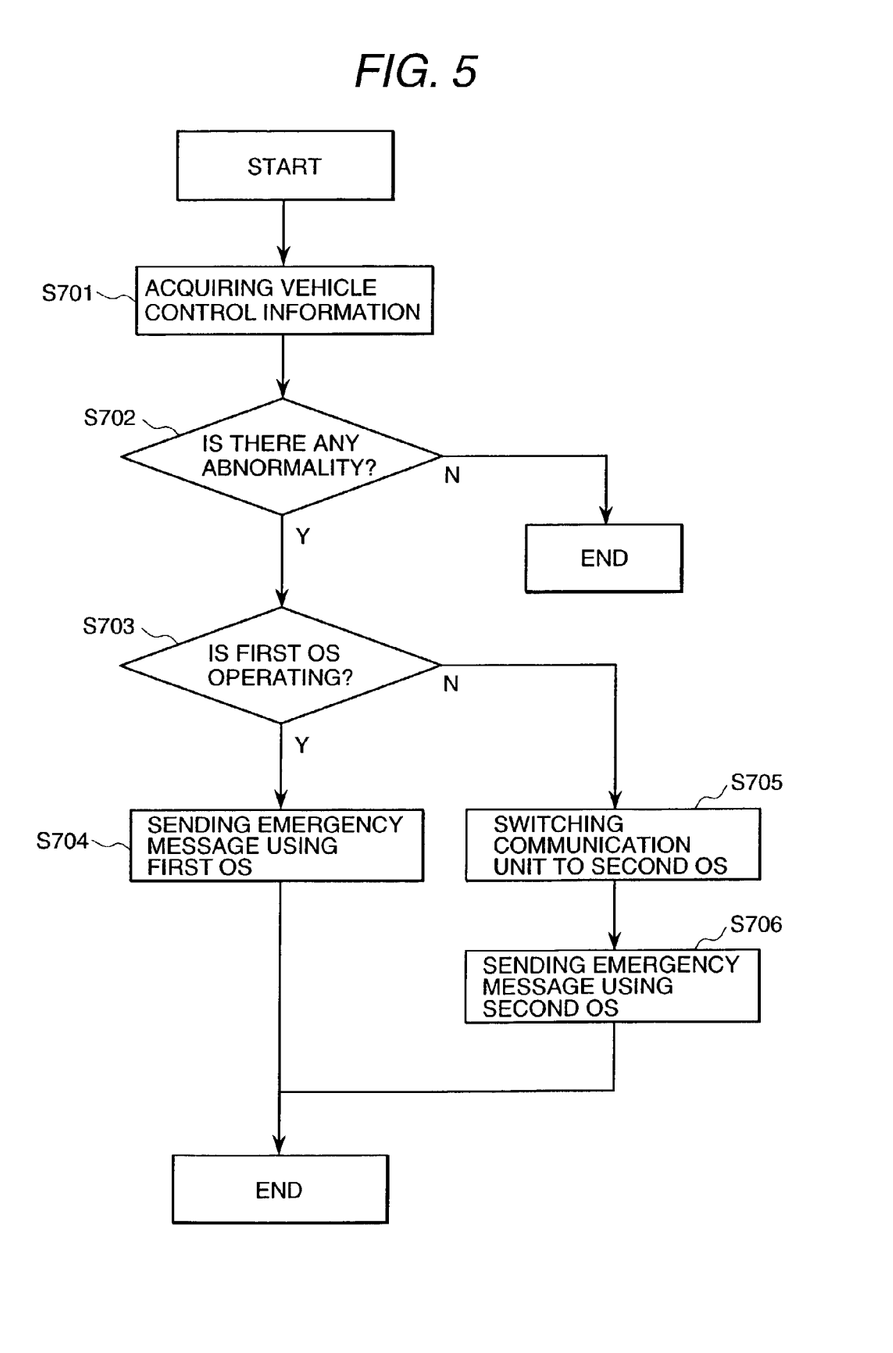
FIG. 5 is a flowchart explaining the processing that the second OS detects an abnormality of a vehicle and sends an emergency message.

FIG. 5 is a flowchart explaining the processing that the second OS 207 in the present embodiment detects an abnormality of the vehicle, and sends an emergency message.

The second OS 207 receives vehicle control information from the vehicle control unit 901 periodically or by interrupt processing from the LAN unit 105 (S701). Then, in the vehicle abnormality detecting function, it is judged whether or not there is any abnormality in the obtained vehicle control information (S702). As the result, if it is judged that there is an abnormality, the emergency message sending function 1402 is started to check the status of the first OS 206 (S703). Then, if the first OS 206 is in operation, the first OS 206 controls the short distance wireless communication unit 1061 to send an emergency message to an appropriate emergency message receiver (S704). On the other hand, if the first OS 206 is in stopping, the allocation of the communication unit 106 is switched to the second OS 207 (S705). Then, the second OS 207 controls the communication unit 106 to send the emergency message to the appropriate emergency message receiver (S706). At that time, the emergency message receiver can be judged from a present position detected by the position detecting function 1401 and the list of emergency message receivers 1403.

Therein, in the case where it is judged that there is an abnormality, it is possible that the allocation of the communication unit 106 is switched to the second OS 207 having high reliability irrespective of the status of the first OS 206, and the second OS controls the communication unit 106 to send the emergency message to the appropriate emergency message receiver. Otherwise, the communication unit 106 may be allocated to the second OS 207 in the beginning. In this case, it is not always necessary that the plurality of operating systems is operated by the navigation system. For example, the communication unit 106 can be applied to an on-vehicle navigation system which is controlled by a single operating system.

Further, when the vehicle abnormality detecting function 900 detects an abnormality, the emergency massage sending function 1402 may display the emergency message receiver on the display unit 102 in order to notify the user at the same time or before sending the emergency message outside the vehicle.

As having been described above, according to the present invention, in the on-vehicle terminal system operating the plurality of operating systems, control peripheral devices connected to the on-vehicle terminal system can continued even if one of the operating systems is stopped. Further, according to the present invention, in the on-vehicle terminal system for controlling the communication unit, an emergency message can be sent to the outside of the vehicle in an emergency.

What is claimed is:

1. An on-vehicle terminal system comprising:
   an arithmetic-and-logic processing part in which first and second operating systems, independent of each other, are operated to execute processes of the on-vehicle terminal; and an input/output control part, connected to a plurality of peripheral devices, including at least a communication unit, wherein the arithmetic-and-logic processing part has means for allocating an interrupt signal from at least one of the peripheral devices to either one of the first and second operating systems, and wherein the means for allocating the interrupt signal comprises:

means for storing an allocation list storing either one of the first and second operating systems to which, for each peripheral device, a control is allocated;

means for acquiring and controlling an operating status of each of the first and second operating systems; and means for restarting the first operating system based on a request from the second operating system, wherein the second operating system comprises means for acquiring and monitoring the operating status of the first operating system and means for directing switching of the first and second operating systems allocated to the at least one of the peripheral devices, wherein, when the means for acquiring and monitoring said operating status detects that the first operating system is stopped, the means for directing switching of the operating systems changes processing of an interrupt signal received from the at least one of the peripheral devices from being processed by the first operating system to being processed by the second operating system, and afterwards the means for acquiring and monitoring said operating status directs the means for restarting the first operating system to restart the first operating system, wherein, when the means for acquiring and monitoring said operating status detects that the first operating system is restarted, the means for directing switching of the operating systems changes processing of said interrupt signal back to being processed by the first operating system.

2. An on-vehicle terminal system according to claim 1, wherein the on-vehicle terminal system further comprises abnormality acquisition means for acquiring information on abnormalities on a vehicle, and emergency communication means for sending information on an abnormality, using said communication unit, when said abnormality acquisition means acquires the information on abnormalities.

3. An on-vehicle terminal system according to claim 2, which further comprises position detecting means for detecting a position of the vehicle, wherein said emergency communication means sends a message to a predetermined message receiver according to the position of the vehicle.

4. An on-vehicle terminal system according to claim 2, wherein said communication unit comprises a wireless interface.

5. An on-vehicle terminal system according to claim 1, which comprises a navigation function.

* * * * *